L. A. YOUNG.
UPHOLSTERY SPRING CONSTRUCTION.
APPLICATION FILED FEB. 10, 1919.
1,338,806.
Patented May 4, 1920.
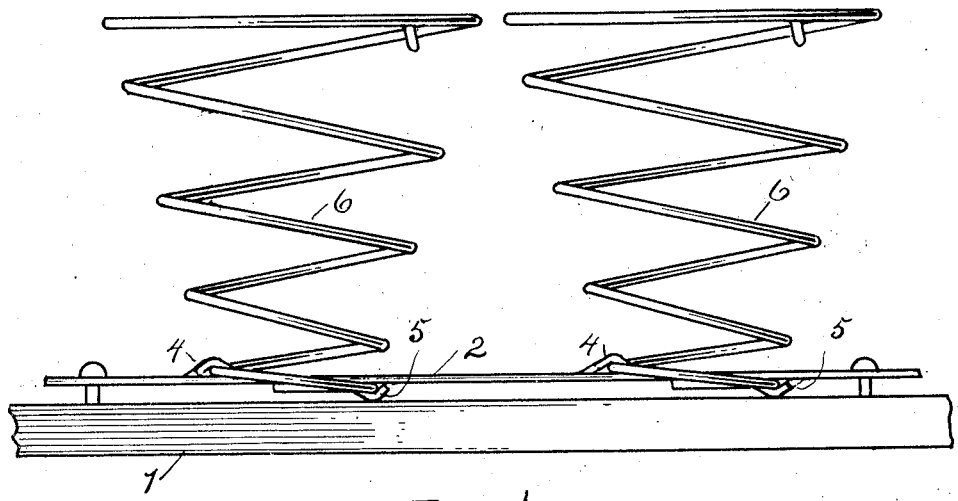
Fig. 1.
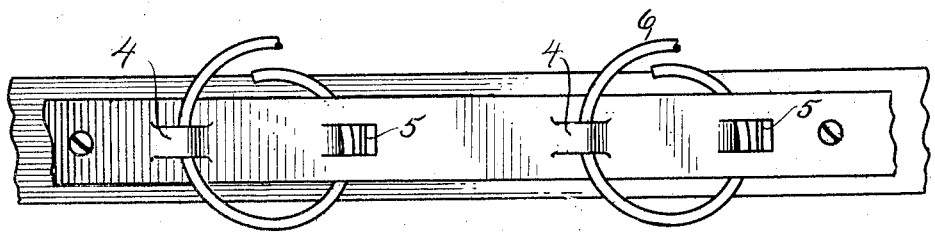
Fig. 2.
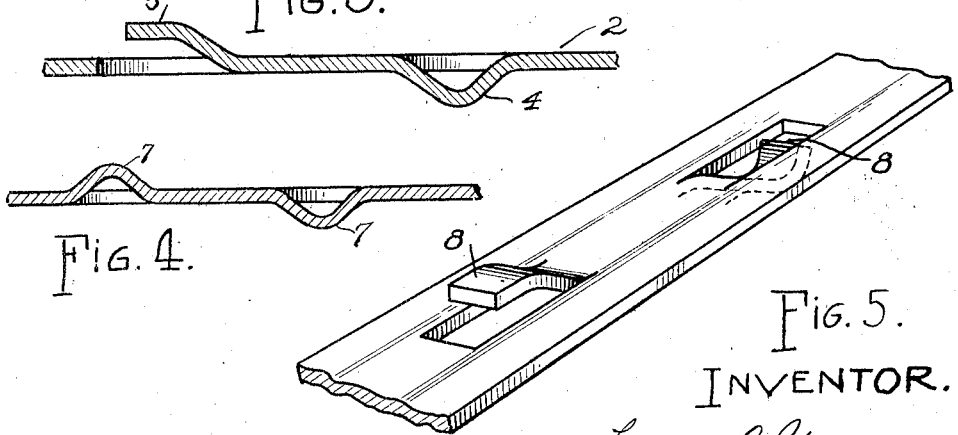
Fig. 3.
Fig. 4.
Fig. 5.
INVENTOR.
Leonard A. Young
BY Clement R. Stickney
ATT'Y.

L. A. YOUNG.
UPHOLSTERY SPRING CONSTRUCTION.
APPLICATION FILED FEB. 10, 1919.
1,338,806. Patented May 4, 1920.
2 SHEETS—SHEET 2.
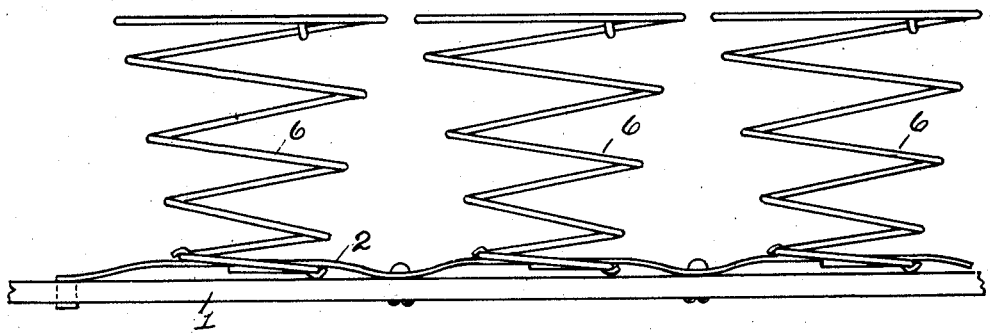
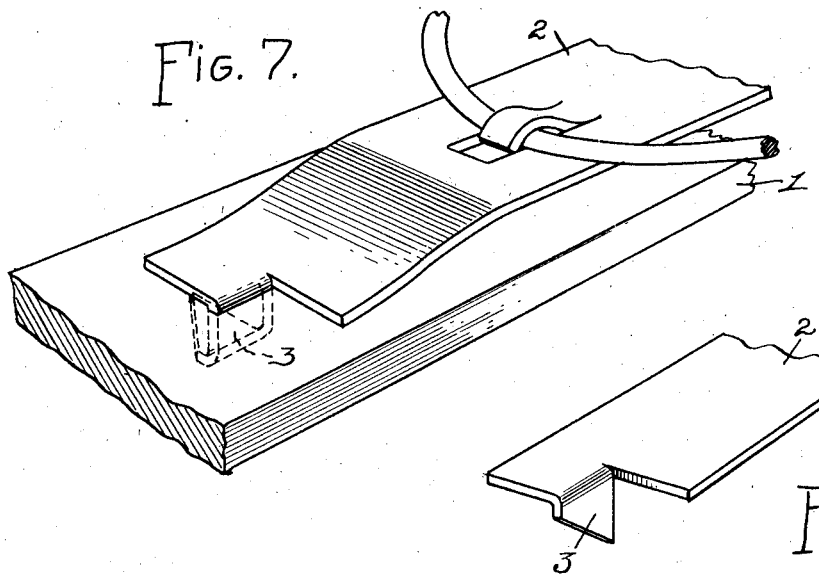
INVENTOR
Leonard A. Young
BY Clement R. Stickney
ATT'Y.

UNITED STATES PATENT OFFICE.

LEONARD A. YOUNG, OF DETROIT, MICHIGAN.

UPHOLSTERY-SPRING CONSTRUCTION.

1,338,806.   Specification of Letters Patent.   Patented May 4, 1920.

Application filed February 10, 1919. Serial No. 276,226.

*To all whom it may concern:*

Be it known that I, LEONARD A. YOUNG, a citizen of the United States, residing at Detroit, in the county of Wayne and State of Michigan, have invented certain new and useful Improvements in Upholstery-Spring Construction, of which the following is a specification.

In the use of upright coil springs of the usual hour-glass or conical type, in upholstery seat construction, it is usually necessary to tie or secure the base coil on which the spring rests so as to form a closed loop which is substantially perpendicular to the axis of the spring helix. This necessitates a special tying process or step in making the spring itself and a form of fastening to the supporting means which must be closed over or otherwise caused to grip this closed loop.

This invention relates to an upholstery spring construction and more especially to an arrangement of the spring support and springs thereof whereby the spring may be threaded into place and maintained in an upright position when so located, without the necessity of first closing the base coil and distorting it from the normal spiral of the spring into a right plane perpendicular to the spring axis.

One object of the invention is to provide a spring strip support that is yielding and that may be readily assembled in the base frame or other suitable support, while at the same time it may be baled or shipped "knocked down."

In the drawings:

Figure 1 is a view in elevation of a portion of a spring construction embodying features of the invention;

Fig. 2 is a plan view thereof, with the springs partially broken away;

Fig. 3 is a view in longitudinal section in detail of an attaching band;

Figs. 4 and 5 are views in detail of modifications of the band;

Fig. 6 is a view in elevation of a modification of the structure; and

Figs. 7 and 8 are views in detail of band holding means.

Referring to the drawings, a supporting strip 1 or portion of the upholstery base or other like part, carries a bendable sheet metal band 2 that may be tacked in position or preferably has the end portion thereof notched or cut with the severed part bent down as a spur 3 which interlocks with the supporting strip 1.

If the base strip is of wood or like penetrable material, the spur is driven through it or into it. If of metal, the supporting member is appropriately apertured.

A series of loops 4 formed by parallel slits, are bent out from the band and a tongue 5 for each of the loops is struck out and bent oppositely, each pair, consisting of a tongue and loop, being placed so that the lower turn of an upright coil spring 6 may be screwed through the loop and then under the band and between the band and the companion tongue. This arrangement holds the spring in an upright position.

By bending down the body of the band outside the spring helix and adjacent to the tongue 5 or, conversely, forcing the tongue upwardly, the spring is clenched in place in an upright position without the necessity of forming the usual closed base or tied end loop in the spring. Obviously, there may be different combinations of the loops and tongues. In Fig. 4 two loops are shown; in Fig. 5, two tongues 8 are used.

Thus the springs are easily assembled on the strips as there are no clips for securing them; the springs do not have to be notched or tied and when in position they are secured in upright relation to the strip while the latter is resilient.

When assembled the strips may be placed as desired in or on any preferred means of support, as for example a base, the side members of which lie under the end portions only of the strips, or if preferred, the strips may be secured by sheet metal U-strips embracing the edges of the end portions only.

Obviously, changes in the details of construction may be made without departing from the spirit of the invention and I do not care to limit myself to any particular form or arrangement of parts.

What I claim is:

In upholstery spring construction, a resilient supporting strip of penetrable material, upright body springs the bases of which rest on the strip and a band of flexible metal having downturned spurs that are inserted in the supporting strip, the band overlying the base coils of the springs and being bent to embrace them, and the downturned spurs being formed by slitting the edges of the strip near the ends thereof and inbending the portion of the strip between each slit and the adjacent end.

LEONARD A. YOUNG